United States Patent [19]

White et al.

[11] Patent Number: 4,737,523

[45] Date of Patent: Apr. 12, 1988

[54] FOAMABLE MOLDING COMPOSITIONS

[75] Inventors: Roger J. White; Sivaram Krishnan; Wolfgang J. Siebourg, all of Pittsburgh, Pa.

[73] Assignee: Mobay Corporation, Pittsburgh, Pa.

[21] Appl. No.: 64,168

[22] Filed: Jun. 19, 1987

Related U.S. Application Data

[63] Continuation-in-part of Ser. No. 910,926, Sep. 23, 1986, abandoned, and a continuation-in-part of Ser. No. 774,679, Sep. 9, 1985, abandoned.

[51] Int. Cl.$^4$ .............................................. C08J 9/06
[52] U.S. Cl. ..................................... 521/91; 521/79; 521/81; 521/94; 521/134; 521/138; 521/139; 525/148; 525/170
[58] Field of Search ................. 521/94, 134, 138, 139, 521/79, 81

[56] References Cited

U.S. PATENT DOCUMENTS

| | | | |
|---|---|---|---|
| 3,586,658 | 6/1971 | Wooster | 260/47 EA |
| 3,888,801 | 6/1975 | Hunter et al. | 260/2.5 R |
| 4,207,402 | 6/1980 | Sprenkle, Jr. | 521/139 |
| 4,312,958 | 1/1982 | Di Guilio | 521/88 |
| 4,323,655 | 4/1982 | Di Guilio | 521/88 |
| 4,378,449 | 3/1983 | Witman | 525/67 |
| 4,420,584 | 12/1983 | Rawlings et al. | 524/502 |

*Primary Examiner*—Morton Foelak
*Attorney, Agent, or Firm*—Gene Harsh; Joseph C. Gil; Aron Preis

[57] ABSTRACT

Foamable, thermoplastic molding composition exhibiting an improved level of impact resistance is provided. The composition, which is suitable for the preparation of expanded molded parts, comprise a thermoplastic resin, preferably at least one selected from a group consisting of polycarbonate, polyalkylene terephthalate, aromatic polyester and polyester carbonate, a nucleating agent, a chemical blowing agent and an anhydride. It was unexpectedly found that the composition is suitable for the molding of articles having an improved level of impact resistance.

15 Claims, No Drawings

FOAMABLE MOLDING COMPOSITIONS

The present application is a continuation-in-part of co-pending U.S. application Ser. No. 910,926, filed on Sept. 23, 1986, now abandoned and U.S. application Ser. No. 774,679, filed Sept. 9, 1985 now abandoned.

FIELD OF THE INVENTION

The present invention relates to foamable molding compositions and in particular to impact resistant foamable molding compositions.

SUMMARY OF THE INVENTION

Foamable, thermoplastic molding composition exhibiting an improved level of impact resistance is provided. The composition, which is suitable for the preparation of expanded molded parts, comprise a thermoplastic resin, preferably at least one selected from a group consisting of polycarbonate, polyalkylene terephthalate, aromatic polyester and polyester carbonate, a nucleating agent, a chemical blowing agent and an anhydride. It was unexpectedly found that the composition is suitable for the molding of articles having improved level of impact resistance.

BACKGROUND OF THE INVENTION

Foamable molding compositions containing chemical blowing agents are known. U.S. Pat. No. 3,888,801 discloses the chemical blowing agents which are suitable in the context of the present invention. Resins which are suitable in the present invention are also disclosed in that patent. Also known are the anhydrides of the invention; U.S. Pat. No. 4,420,584 discloses glass filled polycarbonate compositions having an improved impact strength, containing these anhydrides. The art however does not appear to have recognized the unexpected advantages associated with the combination of these components in the context of the present invention.

DETAILED DESCRIPTION OF THE INVENTION

The polymeric resin component of the composition of the invention is a thermoplastic resin which is both suitable for foaming, i.e. foamable, and sensitive to the foaming agent's decomposition products which contain primary amines, for instance, an amino urazole. Sensitivity in the present context is considered to be a proclivity to structural degradation which is expressed in terms of a reduction in molecular weight which results upon exposing the resins to the decomposition products at the molding temperature of the resin. Among the sensitive resins, there are polycarbonate polyalkylene terephthalate aromatic polyester and polyester-carbonate. The preferred resins are polycarbonate and polyalkylene terephthalate.

In the present context, polycarbonate resins have a molecular weight (weight average) of about 10,000 to about 200,000, preferably about 20,000 to about 80,000 and may alternatively be characterized as having a melt flow rate per ASTM D-1238 at 300° C., of about 1 to about 24 gm/10 minutes, preferably about 2-6 gm/10 minutes. Polycarbonates which are suitable for the preparation of the preferred compositions of the invention are available in commerce—for instance under the trademark Merlon ®, from Mobay Chemical Corporation. The preparation of polycarbonate resins, preferably by interfacial condensation of certain dihydroxy compounds with phosgene has been well documented—see, for instance, the manuscript *Chemistry and Physics of Polycarbonates* by Hermann Schnell, Interscience Publishers, 1964, which is incorporated by reference herein.

Dihydroxy compounds suitable for the preparation of the polycarbonates of the invention to conform to the structural formulae (1) or (2)

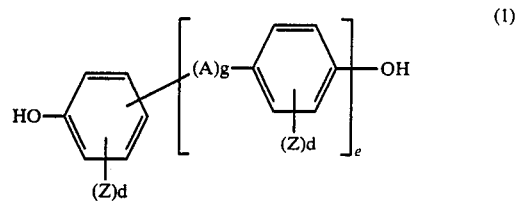

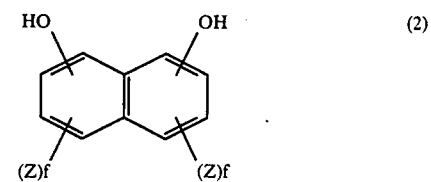

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO$_2$—radical; or a radical of the general formula

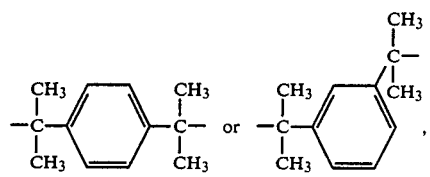

g denotes the number 0 or 1;
e denotes the number 0 or 1;
Z denotes F, Cl, Br or a C$_1$–C$_2$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfide, bis-(hydroxyphenyl)-sulfones and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,2-bis-(4- hydroxyphenyl)-2-methyl-butane, 1,1-bis-(4-hydroxyphenyl)cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred dihydroxy compound is 2,2-bis-(4-hydroxyphenyl)-propane (bisphenol A).

The polycarbonates of the invention may entail in their structure, units derived from one or more of the suitable dihydroxy compounds.

The preparation of polycarbonate resins may be carried out in accordance with any of the processes known in the art, for example, by the interfacial polycondensation process, polycondensation in a homogeneous phase or by transesterification. The suitable processes and the associated reactants, catalysts, solvents and conditions are known in the art and have been described in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273, all incorporated herein by reference.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol % (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4,-bis-(4-hydroxyphenylisopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)phenyl)-orthoterephthalic acid ester, tetra-(4-hydroxyphenyl)-methane, tetra-(4-(4-hydroxyphenylisopropyl)phenoxy)-methane and 1,4-bis-(4',4''-dihydroxytriphenyl)methyl-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

The polyalkylene terephthalate resins which are suitable in the present context are known. The preferred species, polyethylene terephthalate (PET) and polybutylene terephthalate (PBT) are available in commerce. Their chemical makeup and processes for preparation are known and have been described in, among others, U.S. Pat. Nos. 2,465,319 and 3,047,539, both incorporated herein by reference.

Aromatic polyesters and polyester-carbonates are known in the art. These have been described in the following documents, all of which are incorporated herein by reference. U.S. Pat. Nos. 4,252,939; 4,260,731; 4,360,648; 4,338,422; 4,369,303; 3,030,331; 3,169,121; 3,110,698; 4,130,548; 4,240,968 and 4,330,662. Also incorporated by reference in this connection are German Nos. 2,232,877; 1,495,626; 1,495,302; 2,753,230; 3,016,020; French Pat. No. 1,492,430; European Pat. Nos. 8492; 10840; 17740; 28353 and 50847; and the article 'Synthesis of Poly(ester Carbonate) Copolymers", D. C. Prevorsek et al, *Journal of Polymer Science: Polymer Chemistry Edition*, Vol. 18, 75–90 (1980).

The blowing agent in the present context is characterized in that its thermal decomposition products comprise a primary amine, preferably an amino urazole. Among the suitable agents, there are hydrazodicarboxylates which are noted for the great volume of gas evolution attendant upon their thermal decomposition. These hydrazodicarboxylates conform to

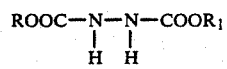

where R and $R_1$ independently denote a member selected from the group consisting of primary, secondary and tertiary straight-chain or branched-chain $C_1$–$C_8$ alkyl, $C_5$–$C_8$ cycloalkyl, $C_6$–$C_{10}$ aryl, $C_7$–$C_{10}$ aralkyl and $C_7$–$C_{10}$ alkaryl radicals. Preferred species have at least one of R and $R_1$ selected from the group consisting of isopropyl, secondary butyl and tertiary butyl and the other of R and $R_1$ is a $C_1$–$C_4$ alkyl. Most preferred species are those wherein both R and $R_1$ are selected from the group consisting of isopropyl, secondary butyl and tertiary butyl. The foaming agent most suitable is diisopropylhydrazodicarboxylate:

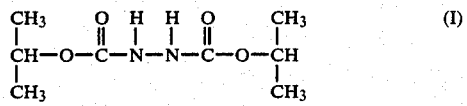   (I)

U.S. Pat. No. 3,888,801, which disclosure is incorporated herein by reference, contains further information respecting the hydrazodicarboxylates of the invention. The most suitable foaming agent may be prepared in accordance with the technique disclosed in U.S. Pat. No. 3,888,801. This agent is characterized in that its melting temperature is about 221°–224° F. and its decomposition temperature is about 520°–590° F. Upon its decomposition, it generates an amount of 4-aminourazole corresponding to about 15% of its original weight.

The anhydride of the invention is a polymeric compound containing at least one cyclic anhydride in its structure. Preferably the anhydride is a polymeric compound containing at least one maleic acid anhydride unit in its repeating unit; most preferably the anhydride is a copolymer of maleic acid anhydride and an olefin. Examples of suitable olefins are styrene, vinyl ether and methyl vinyl ether. Among the most suitable are the anhydrides which are represented by the structural formula:

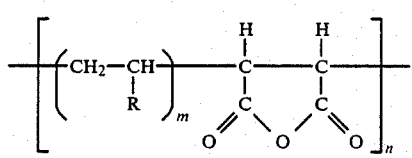

where R is a substituted or an unsubstituted radical selected from the group consisting of $C_6$–$C_{12}$ phenyl, $C_1$–Chd 12 alkoxy and $C_1$–$C_{28}$ alkyl radicals. In general, the carbon atoms of R may not be greater in number than 28, while n is an integer of from 1 to 200, and m is an integer of from 1 to 5. In the most preferred embodiment, n is about 145 and m is 1. The preparation of suitable anhydride, namely copolymers of maleic anhydride and an α-olefin is described in U.S. Pat. No. 3,586,659, hereby incorporated by reference. Examples of olefin compounds suitable for forming the anhydride of the composition include: ethylene; 1-propane; 1-decane, 1-butene; 1-undecene; 1-isobutylene; 1-hexene; 1-dodecene; 1-pentene; 1-tridecene; 1-heptene; 1-octene; 1-tetradecene; 1-octadecene; 1-nonadecene; styrene; 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 8:1.

The preferred anhydride suitable in the practice of the invention is a copolymer of 1-octadecene and maleic anhydride of a 1:1 molar ratio is available from Gulf Oil Chemical Company under the tradename PA-18. Typically, PA-18 is further characterized by its properties shown in the table below:

| Color/form | White powder |
| --- | --- |
| Molecular weight | 50,000 |
| Specific gravity | 0.97 |
| Melting point range | 110–120 |
| Inherent viscosity[1] | 0.10–0.13 |
| Viscosity | |
| @ 150° C.: (cps) | 20,000 |
| @ 160° C.: (cps) | 8,000 |
| Anhydride equivalent, meg/g | 3.10–3.25 |
| Neutralization equivalent, meg/g | 4.83–5.53 |
| Anhydride content wt. % | 15–23 |
| Acid content, wt. % | 5–10 |
| Volatiles, % | 1 |
| Residual monomer | 3 |
| Thermal stability | |
| @ 250° C. (wt. loss %) | 1 |
| @ 300° C. (wt. loss %) | 3 |
| @ 350° C. (wt. loss %) | 10 |
| @ 400° C. (wt. loss %) | 23 |

[1] 5 gm/100 ml in methylisobutyl ketone @ 77° F.

PA-10 and PA-6 too are anhydrides suitable in the present context and are largely similar to PA-18 except for their respective olefins. In these anhydrides the corresponding olefins are α-decene and α-hexene. Random copolymers of a cyclic anhydride are included in the invention although they represent a less preferred embodiment.

Additionally, the composition of the invention needs to contain an amount of a nucleating agent sufficient to bring about a uniform size distribution of the cells. Preferably, the amount of the nucleating agent is about 0.05 to 4 percent relative to the weight of the composition. The nucleating agents for structural foams are well known in the art and among them, mention is made of glass fibers and milled glass.

ILLUSTRATIONS OF THE INVENTION

In the preparation of the compositions in accordance with the invention and of the comparison examples the following materials and conditions were used.

The polycarbonate resin was Merlon M-50, a homopolymer based on bisphenol A, having a melt flow rate, per ASTM D-1238, of about 5.1 gms/10 min., from Mobay Chemical Corporation. The anhydride was PA-18. Other anhydrides differing from PA-18 in terms of the chain length of the α-olefin are noted wherever used.

The chemical blowing agent used in illustrating the invention conforms to formula (I) above. The prior art chemical blowing agent was 5-phenyl tetrazole. In preparing the examples which are noted below, glass fibers at an amount of about 4.5% were used both as a nucleating agent and to provide rigidity to the resulting foam. The compositions contained, where noted, a flame retarding agent (potassium perfluorobutane sulfonate), a phosphite stabilizer and a pigment, none of which are believed critical to the invention.

Extrusions were carried out using a single screw extruder (2.75:1 screw, 100 rpm at about 275° C.). The pellets were injection molded into foamed discs ($\frac{1}{4}"\times 4"$) under the following conditions: mold temperature 170° F., cycle time 60 seconds, screw speed 75 rpm, barrel temperature 300° C., melt temperature 295° C., primary injection pressure 1800 psi, secondary injection pressure 0, back pressure 100 psi.

In the process of preparing the molded part, resinous polycarbonate pellets containing the anhydride and no blowing agents were blended with a blowing agent concentrate and injection molded. Variations of the preparation process including using the blowing agent per se rather than the concentrate are also possible. The concentrates used in the course of preparation of compositions in accordance with the invention contained polycarbonate resin and 10% of the foaming agent of formula (I). The prior art concentrates contained 10% of 5-phenyltetrazole and a plasticizer.

In evaluating the properties of the molded articles, a Gardner impact tester (Model #IG1120-M with a tup diameter of 0.5" and a 1.25" diameter base) was used. Any crack seen or felt opposite the point of impact was regarded as failure of the tested specimen. The quantitative assessment of the impact resistance in inch. lbs. (impact resistance) made use of the Bruceton staircase method, per ASTM D-3029. The Instron melt stability is a measure of the apparent viscosity of a resin as a function of time at constant temperature (300° C.), and shear rate (56.7 sec.$^{-1}$). An Instron melt rheometer was fluid for this determination. Melt flow rate (MFR) was determined in accordance with ASTM D-1238 (300° C.-1200 g load), the units are gm/10 min.

The invention is further illustrated, but is not intended to be limited by the following examples in which all parts and percentages are by weight unless otherwise specified.

EXAMPLES

Examples 1–6

In these examples, pellets comprising a polycarbonate resin and an anhydride (PA-18) were blended with a blowing agent concentrate containing the foaming agent of formula (I) above. A series of comparison examples entailed similar pellets except that the blowing agent concentrate contained 5-phenyltetrazole. The amount of the chemical blowing agent in the blends was calculated to yeild equal foaming to the molded parts, that is equal reduction in density.

TABLE 1

| Example | Anhydride Content (%) | MFR[2] of Pellet | Properties of Compositions of the Invention | | Properties of Prior Art Compositions | |
|---|---|---|---|---|---|---|
| | | | MFR[2] of Part | Impact Resistance (in. lb.) | MFR[2] | Impact Resistance (in. lb.) |
| 1[3] | 0 | 5.4 | 23.0 | 134 | 25.6 | 139 |
| 2[3] | 0.8 | 5.1 | 16.1 | 268 | 31 | 118 |
| 3[3] | 1.6 | 5.1 | 9.7 | 292 | 23.3 | 125 |
| 4[1] | 1.6 | 5.7 | — | 191 | — | — |
| 5[1] | 0.8 | 4.4 | — | 206 | — | — |
| 6[1] | 0 | 3.3 | — | 169 | — | 136 |

[1] Pigmented resin
[2] In accordance with ASTM D-1238
[3] These compositions contained about 0.1% of a flame-retarding agent; all compositions contained about 4% of glass fibers.

Examples 7-13

Additional compositions in accordance with the invention were prepared and foamed molding made therefrom. The base resin in this series consisted of a blend (9.75/5.25 by weight) of bisphenol A based homopolycarbonates having an MFR of 4.2 and 9.4 gm/10 min, respectively. The compositions all contained about 4.5% glass fibers as a nucleating agent and the foaming agent of formula (I) above in an amount calculated to yield equal foaming to the molded parts; composition 13 in this series made use of 5-phenyl tetrazole.

TABLE 2

| Example | Anhydride Content in the Pellets | MFR of Pellet | MFR of the Composition | Impact Resistance of Part |
|---|---|---|---|---|
| 7 | 0 | 9.4 | 25.1 | 122 |
| 8 | 1.0[1] | 8.7 | 15.7 | 188 |
| 9 | 0.67 | 8.9 | 15.7 | 193 |
| 10 | 0.59 | 8.3 | 21.7 | 135 |
| 11 | 2.2 | 7.9 | 34.4 | 96[3] |
| 12 | 4.6 | 8.9 | 20.5 | 148 |
| 13 | 0[2] | | 33.4 | 93 |

[1] The anhydrides used in this series are as follows: Example 8: PA-18; Example 9: PA-10; Example 10: PA-6; Example 11: Dylark 350 (a styrene-maleic anhydride copolymer - approx. 12% anhydride from Arco, Inc.), Example 12: Dylark 232 (similar to Dylark 350 except for 6% maleic anhydride). Dylark 350 and Dylark 232 are examples of random copolymers.
[2] foamed with 5-phenyltetrazole
[3] the low value is believed to have resulted from hydrolysis of the anhydride functional group.

Other additives introduced in similar compositions in substitution for the anhydrides of the invention proved unsuccessful. Among these were epoxy-bearing compounds and monomeric anhydrides (pyromellitic dianhydride, phthalic anhydride and tetrabromophthalic anhydride).

Examples 14-21

Additional compositions in accordance with the invention were prepared and their properties determined. The preparation followed the procedure outlined above. Except for Example 15 where 5-phenyltetrazole served as a foaming agent, the compositions below were foamed using the foaming agent having the formula (I) above; the amount of foaming agent in each case was calculated to bring about equal reduction in density to the molded part. All the compositions maintained about 4.5% of glass fibers as a nucleating agent.

| Example | Anhydride Content | MFR (Pellet) | MFR (Part) | Impact Resistance |
|---|---|---|---|---|
| 14 | (Control A)[1] | 3.2 | 16.7 | 155 |
| 15 | (Control B)[2] | 3.2 | 17.8 | 164 |
| 16[3] | PA-18; 0.3% | 4.3 | 19.1 | 347 |
| 17[3] | PA-18; 1.0% | 4.7 | 23.5 | 181 |
| 18[3] | PA-10; 0.3% | 4.1 | 20.2 | 252 |
| 19[3] | PA-10; 1.0% | 3.6 | 11.4 | 202 |
| 20[3] | PA-6; 1.0% | 4.0 | 15.4 | 305 |
| 21 | Gantrez[4]; 1.0% | 4.8 | 8.7 | 317 |

[1] no anhydride was added; foaming by the agent of formula (I)
[2] no anhydride was added; foaming by 5-phenyltetrazole
[3] The anhydrides in compositions 16-20 were heated before using at 90° C. for 16 hours @ 23 torr, to assure dehydration.
[4] A copolymer of methyl vinyl ether and maleic anhydride (1:1 mole ratio, molecular weight - by membrane osmometry in 2-butanone 1-10 gms/1000 ml solution - 50,000; a product of GAF)

Examples 22-29

In the series of experiments which are described below, comparisons were drawn between compositions of the invention in terms of the dependence of their melt stability on the degree of hydrolysis of the anhydride resins. The base composition contained the same ingredients entailed in the above compositions except for the noted anhydrides below.

| Example | Anhydride Added | Melt Viscosity, kPa at 300° C. | | | |
|---|---|---|---|---|---|
| | | 5 min. | 35 min. | 65 min. | kPa[1] |
| 22 | PA-10 (h); 0.3% | 1577 | 1504 | 1153 | 424 |
| 23 | PA-10 (d); 0.3% | 1479 | 1293 | 1241 | 238 |
| 24 | PA-18 (h); 0.3% | 1768 | 1370 | 1328 | 440 |
| 25 | PA-18 (d); 0.3% | 1500 | 1344 | 1318 | 182 |
| 26 | PA-10 (h); 1.0% | 1706 | 827 | — | 879[2] |
| 27 | PA-10 (d); 1.0% | 1675 | 1293 | 1070 | 382[2] |
| 28 | PA-18 (h); 1.0% | 1747 | 1189 | 931 | 816 |
| 29 | PA-18 (d); 1.0% | 1344 | 1075 | 791 | 553 |

(h) hydrolyzed additive
(d) dehydrated (vacuum dried at 90° C. for 16 hours) additive
[1] after 65 minutes
[2] after 35 minutes Since the lowered melt viscosity indicates molecular weight reduction which is associated with degradation, the data—Instron melt stability—shows that the dehydrated additives caused less of a molecular weight reduction in the compositions of the invention.

Generally, the amount of blowing agent used in the present invention depends on the resin to be expanded and on the desired density of the foam thus produced. Usually about 0.05 to about 15, preferably 0.1 to about 5.0 parts of blowing agent are used per 100 parts by weight of the resin.

The amount of anhydride to be used in the preparation of the molding compositions is 0.01 to 10 percent, preferably 0.05 to 2 percent in relation to the weight of the resin. Optionally, reinforcing glass fibers in an amount of 5-30 percent by weight may be included in the composition.

The compositions of the invention may contain further additives which are known in the art for their efficacy in the context of foamable molding compositions. These include various reinforcing agents, fillers, pigments and dyes, plasticizers, UV and hydrolysis stabilizers, flame retardants and mold release agents. In practicing the invention, it is preferred to compound first the resin, the anhydride and the auxiliary additives and form pellets therefrom. These pellets are then blended with a blowing agent concentrate containing a suitable amount of the blowing agent and nucleating agent of the invention. The mixing may be carried out in a known manner utilizing known equipment. Preferably, mixing may be carried out in an extruder.

Reasonable variations and modifications are possible within the scope of the foregoing disclosure and the claims which follow, without departing from the spirit thereof.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A foamable thermoplastic molding composition comprising
   (i) a foamable thermoplastic resin selected from the group consisting of polycarbonate, polyalkylene terephthalate, aromatic polyester, polyester carbonate,
   (ii) about 0.01 to 10 percent of a polymeric compound containing at least one cyclic anhydride in its structure,
   (iii) 0.1 to 15 percent of a chemical blowing agent the decomposition product of which comprises a primary amine, and
   (iv) an amount of a nucleating agent for structural foam sufficient to produce a substantially uniform cell size in the resulting foam, said percents being in relation to the weight of said (i).

2. The molding composition of claim 1 wherein said (i) is selected from the group consisting of polycarbonate, polyalkylene terephthalate, aromatic polyester and polyester-carbonate.

3. The molding composition of claim 1 wherein said polymeric compound is present at an amount 0.1 to about 5 percent.

4. The molding composition of claim 1 wherein said polymeric compound contains at least one maleic acid anhydride in its structure.

5. The molding composition of claim 4 wherein said anhydride conforms to

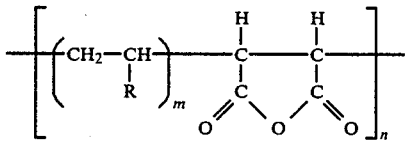

where R is a substituted or an unsubstituted radical selected from the group consisting of $C_6$-$C_{12}$ phenyl, $C_1$-$C_{12}$ alkoxy and $C_1$-$C_{28}$ alkyl radicals, n is an integer of from 1 to 200 and m is 1 to 5.

6. The molding composition of claim 1 wherein said (iii) conforms to

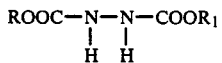

wherein R and $R_1$ independently denote a member selected from the group consisting of primary, secondary and tertiary straight-chain or branched-chain $C_1$-$C_8$ alkyl, $C_5$-$C_8$ cycloalkyl, $C_6$-$C_{10}$ aryl, $C_7$-$C_{10}$ aralkyl and $C_7$-$C_{10}$ alkaryl radicals.

7. The molding composition of claim 6 wherein at least one of R and $R_1$ is selected from the group consisting of isopropyl, secondary butyl and tertiary butyl radicals and the other of R and $R_1$ is $C_1$-$C_4$ alkyl.

8. The molding composition of claim 6 wherein $R_1$ and R independently are selected from the group consisting of isopropyl, secondary butyl and tertiary butyl.

9. The molding composition of claim 6 wherein said (iii) is diisopropylhydrazodicarboxylate.

10. A foamable thermoplastic molding composition comprising
    (i) a thermoplastic polycarbonate resin,
    (ii) about 0.01 to 10 percent of a 1:1 copolymer of α-octadecene and maleic anhydride having a molecular weight of about 50,000, and
    (iii) 0.1 to 15 percent of diisopropyl hydrazodicarboxylate, and
    (iv) 0.05 to 5 percent of a nucleating agent selected from the group consisting of milled glass, glass fibers and talc,
    said percents being relative to the weight of said (i).

11. The molding composition of claim 1 further comprising glass fiber reinforcements.

12. The molding composition of claim 1 further comprising mineral fillers.

13. The molding composition of claim 1 further comprising glass fiber reinforcements and flame-retarding agents.

14. A foamable thermoplastic molding composition comprising
    (i) a foamable thermoplastic resin selected from the group consisting of polyalkylene terephthalate, aromatic polyester and polyester carbonate,
    (ii) about 0.01 to 10 percent of a polymeric compound containing at least one cyclic anhydride in its structure,
    (iii) 0.1 to 15 percent of a chemical blowing agent the decomposition product of which comprises a primary amine, and
    (iv) an amount of a nucleating agent for structural foam sufficient to produce a substantially uniform cell size in resulting foam, said percents being in relation to the weight of said (i).

15. A foamable thermoplastic molding composition comprising
    (i) a foamable thermoplastic resin selected from the group consisting of polycarbonate, polyalkylene terephthalate, aromatic polyester, polyester carbonate,
    (ii) about 0.1 to 10 percent of a copolymer of α-olefin and maleic anhydride having a molecular weight of about 50,000,
    (iii) 0.1 to 15 percent of a chemical blowing agent the decomposition product of which comprises a primary amine, and
    (iv) an amount of a nucleating agent for structural foam sufficient to produce a substantially uniform cell size in the resulting foam, said percents being in relation to the weight of said (i).

* * * * *